(12) United States Patent
Ella et al.

(10) Patent No.: US 12,684,253 B2
(45) Date of Patent: Jul. 14, 2026

(54) SYSTEM AND METHOD FOR COLLABORATIVE PHOTOGRAPHY

(71) Applicants: Amir Ella, Jerusalem (IL); Raziel Ella, Jerusalem (IL)

(72) Inventors: Amir Ella, Jerusalem (IL); Raziel Ella, Jerusalem (IL)

( * ) Notice: Subject to any disclaimer, the term of this patent is extended or adjusted under 35 U.S.C. 154(b) by 16 days.

(21) Appl. No.: 18/904,071

(22) Filed: Oct. 1, 2024

(65) Prior Publication Data

US 2026/0095678 A1 Apr. 2, 2026

(51) Int. Cl.
H04N 23/90 (2023.01)
H04N 23/63 (2023.01)
H04N 23/661 (2023.01)

(52) U.S. Cl.
CPC ........... H04N 23/90 (2023.01); H04N 23/631 (2023.01); H04N 23/661 (2023.01)

(58) Field of Classification Search
CPC ..... H04N 23/90; H04N 23/631; H04N 23/661
See application file for complete search history.

(56) References Cited

U.S. PATENT DOCUMENTS

| | | | |
|---|---|---|---|
| 7,782,363 B2 * | 8/2010 | Ortiz ........................ | H04N 5/77 |
| | | | 348/157 |
| 9,264,598 B1 * | 2/2016 | Baldwin .............. | H04N 23/661 |
| 9,877,292 B2 * | 1/2018 | Barrett .................. | H04L 67/125 |
| 2023/0067825 A1 * | 3/2023 | Okiyama ............. | H04N 23/667 |

* cited by examiner

*Primary Examiner* — Gevell V Selby

(57) ABSTRACT

Disclosed is a system for cooperative photography. The system comprises a first user device relating to a first user and a second user device relating to a second user. Furthermore, the system includes at least one server arrangement that is communicably coupled to the first user device and the second user device. The server arrangement is configured to receive a first request from the first user device to have cooperative photography. Moreover, the server arrangement propagates the first request to the second user device. Additionally, the server arrangement is further configured to receive at least one response from the second user device corresponding to the first request. The response from the second user device includes an acceptance of the second user via the second user device to participate in the cooperative photography.

9 Claims, 2 Drawing Sheets

SYSTEM AND METHOD FOR COLLABORATIVE PHOTOGRAPHY

FIELD OF THE INVENTION

The present disclosure relates to a system for photography. Moreover, the present disclosure relates to a system for enabling multiple users to collaborate in capturing photographs or videos.

BACKGROUND

Mobile photography has revolutionized the way people capture and share moments. "Mobile photography" is defined herein as photography performed using a portable device such as a smartphone that may be communicably coupled with other devices via cellular networks, satellites, and/or the internet. With the rise of smartphones equipped with high-quality cameras, anyone can be a photographer, making it accessible and easy for people of all ages. This convenience is a key reason why mobile photography has become so popular, especially among tourists.

Tourists readily uses mobile photography because it allows them to quickly capture and share their experiences with friends and family, whether they are exploring a new city, visiting iconic landmarks, or immersing themselves in nature. The portability of smartphones means that they are always on hand, ready to capture spontaneous moments without the need for bulky camera equipment. Additionally, the availability of editing apps lets users enhance their photos instantly, making every shot look professional.

Taking photos when alone can sometimes lead to uncomfortable or even risky situations. Without a friendly person to assist, individuals often find themselves relying on strangers to take their photos, which can be problematic. Trusting an unknown person with a valuable device like a smartphone or camera can be risky, as there's always a chance it could be mishandled, damaged, or even stolen.

Advancement in the field of mobile photography have gained popularity over the years due to a plethora of applications such as instant sharing on social media platforms and seamless integration with other digital devices. However, despite the advancements in mobile photography, there are still certain challenges and limitations within the general domain. One of the common problems faced by individuals is the need to rely on strangers to take their photos.

Additionally, asking a stranger to take a photo might lead to awkward interactions or misunderstandings, especially in unfamiliar or foreign environments where language barriers and cultural differences exist. This can make the experience stressful and detract from the enjoyment of the moment. Moreover, solo photographers might also feel vulnerable in isolated or less crowded areas, where there's a heightened risk of encountering unsafe situations. Without someone trustworthy to watch over them or their belongings, the simple act of taking a photo can become a potentially dangerous endeavour.

Prior art in the field of mobile photography has attempted to address these challenges by introducing features like self-timers, remote shutter controls, and even autonomous drones for capturing images. However, these solutions still require the involvement of the person being photographed, either through setting up the timer or controlling the device remotely. Furthermore, the issue of anonymity remains unresolved, as the photographer may still have access to the personal device or be present during the photo-taking process. Therefore, there is a need for an innovative system that can provide immediate and anonymous service, allowing individuals to be photographed by strangers in a geographical space while ensuring the privacy and convenience of both parties involved.

Therefore, there is a need for innovative solutions that can overcome these limitations and provide effective alerts in various circumstances.

Therefore, in the light of the foregoing discussion, there exists a need to overcome the aforementioned drawbacks.

SUMMARY

The aim of the present disclosure is to provide a system for cooperative photography to enhance collaboration and participation in capturing photos by multiple users.

Another aim of the present invention is to address the limitation of individual photography experiences by enabling users to engage in cooperative photography.

Another aim of the present disclosure is to provide a system and method for cooperative photography to enhance collaboration and participation in capturing pictures and videos by multiple users.

Another aim of the present disclosure is to provide communication between a first user device and a second user device without any physical contact and without need to lend devices to another user, thus eliminating any risk of phone thievery and/or damage during photography.

This invention aims to address the problem of limited perspectives and missed moments in individual photography by enabling users to engage in cooperative photography.

Advantageous features and additional implementations are set out in the appended dependent claims.

Embodiments of the present disclosure substantially eliminate or at least partially address the aforementioned problems in the prior art and improve the collaborative photography experience by providing a system that allows users to easily initiate and participate in cooperative photography sessions.

In an aspect, embodiments of the present disclosure comprise a system for cooperative photography, the system comprising:

at least a first user device relating to a first user;

at least a second user device relating to a second user;

at least one server arrangement, wherein the server arrangement is communicably coupled to the first user device, the second user device;

wherein the server arrangement is configured to:

receive from the first user device, a first request to have the cooperative photography;

propagate the first request received from the first user device to have the cooperative photography to the at least one second user device;

receive from the second user device, at least one response corresponding to the first request to have the cooperative photography, wherein the response from the second user device comprises, at least an acceptance of the second user via the second user device to participate in the cooperative photography.

Optionally, the first request received from the first user device to have the cooperative photography is propagated to the at least one second user device based on at least one pre-defined geographic parameters between the first user device and the second user device, scanning a Quick Response QR code in the second user device using the first user device, by selecting at least one second user device from a virtual map. Optionally, the first request received from the first user device to have the cooperative photography is simultaneously propagated to a plurality of different user devices, and wherein the first request received from the first user device to have the cooperative photography is propagated to the plurality of different user devices until the at least one response is received from the at least one user device of the plurality of different user devices.

Optionally, the at least one response received from the second user device comprises acceptance or rejection of the second user corresponding to the first request to have the cooperative photography.

Optionally, system for cooperative photography comprises at least one application module configured to provide a user interface to the first user device and the second user device, wherein the application module enables the first user to make the first request to have the cooperative photography, and the second user to provide the response corresponding to the first request to have the cooperative photography.

Optionally, the application module is configured to provide the first user device and the second user device, via the user interface, a user feedback and/or user rating page which enables the first user and the second user to provide feedback and/or a user rating to each other, based on experiences of the first user and the second user.

Optionally, the server arrangement is configured to prioritize the propagation of the first request received from the first user device to have the cooperative photography to the user device having higher user ratings compared to the other user devices of the plurality of different user devices.

Optionally, the first user device and the second user device are communicably coupled using at least Wi-Fi™, Bluetooth™, Near Field Connectivity NFC™.

Embodiments of the present invention may also comprise a method for cooperative photography. A first user may provide a first user device. The first user device may be a smartphone or the like that is capable of communicating with other devices via a network such as but not limited to a cellular network or the internet. A second user may provide a second user device. The second user device may also be a smartphone or the like that is capable of communicating with other devices via a network such as but not limited to a cellular network or the internet.

A server arrangement may be provided. The server arrangement may comprise a memory. The memory may be a computer-readable non-transitory memory unit such as but not limited to a hard drive. The server arrangement may be communicably coupled to the first user device and the second user device.

An application module may be configured on the first user device, and the second user device. The application module may be configured to provide a user interface. The first user may use the user interface of the application module to send a first request to the server arrangement. The first request may be a request to have cooperative photography.

The server arrangement may propagate the first request to other user devices, including but not limited to the second user device, as well as a third user device provided by a third user. The first request may be propagated via a network such as but not limited to a cellular network or the internet. The server arrangement may only propagate the first request to devices on which the application module is configured.

The second user device and/or third user device may receive the first request from the server arrangement. The second user device may send a first acceptance to the server arrangement. The third user device may send a second acceptance to the server arrangement. The first acceptance may be sent by the second user via the user interface of the application module configured on the second user device. The second acceptance may be sent by the third user via the user interface of the application module configured on the third user device.

If the first acceptance is sent to the server arrangement before the second acceptance, the server arrangement may send the first acceptance to the first user device and may not send the second acceptance to the first user device. Alternatively, if a user rating of the second user stored on the server arrangement is higher than a corresponding user rating of the third user stored on the server arrangement, then the server arrangement may send the first acceptance to the first user device and may not send the second acceptance to the first user device. The first user may use the user interface of the application module configured on the first user device to receive the first acceptance. Alternatively, if the second user device sends a first rejection to the server arrangement rather than a first acceptance, then the server arrangement may send the second acceptance to the first user device.

The first user device may propagate a first user location using GPS coordinates. The first user location may only be visible to the second user device via the application module. The second user device may propagate a second user location using GPS coordinates. The second user location may only be visible to the first user device via the application module.

The first user and second user may meet in the same physical location. When the first user location and the second user location are determined by the server arrangement to be within a predefined distance, the server arrangement may allow the second user to use the application module configured on the second user device to take a first user picture of the first user. The predefined distance may be small enough to allow the first user and second user to recognize one another and take pictures of one another. The predefined distance may be 50 ft. or less, 20 ft. or less, 10 ft. or less, or any distance including or between the values provided. The server arrangement may use the GPS coordinates of the first user location and the second user location to calculate the predefined distance. When the second user takes the first user picture using the second user device, the first user picture may be automatically sent from the second user device to the server arrangement. The first user picture may then be sent to the first user device. The first user picture may be visible to the first user via the user interface of the application module configured on the first user device.

The first user may use the user interface of the application module configured on the first user device to provide user feedback of the cooperative photography with the second user. The user feedback may be stored in the server arrangement and may be used by the server arrangement to update the user rating of the second user.

Likewise, the second user may use the user interface of the application module configured on the second user device to provide user feedback of the cooperative photography with the first user. The user feedback may be stored in the server arrangement and may be used by the server arrangement to update the user rating of the first user.

Embodiments of the present disclosure substantially eliminate or at least partially address the aforementioned problems in the prior art and improves the safety of the user, user's belongings and ease during the photography when a stranger in involved in the process.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

A better understanding of the present invention may be obtained through the following examples which are set forth to illustrate but are not to be construed as limiting the present invention.

Throughout the description and claims of this specification, the words "comprise", "include", "have", and "contain" and variations of these words, for example "comprising" and "comprises", mean "including but not limited to", and do not exclude other components, items, integers, or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION

Figure 1:
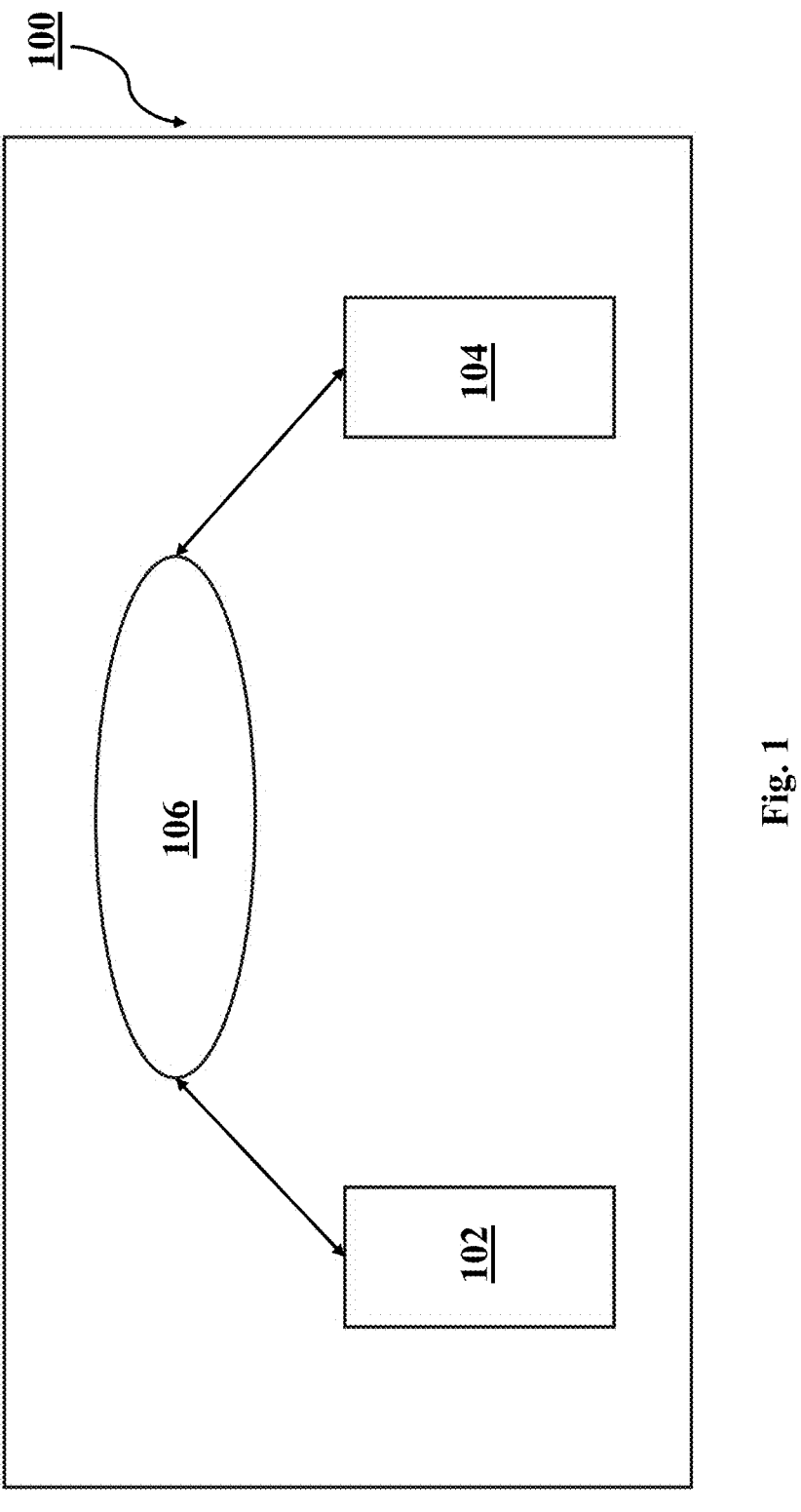
FIG. 1 illustrates a system for cooperative photography in which a first user device and a second user device are communicably coupled with a server arrangement.

The following detailed description illustrates embodiments of the present disclosure and the ways in which they can be implemented. Although some modes of carrying out the present disclosure have been disclosed, those skilled in the art would recognize that other embodiments for carrying out or practicing the present disclosure are also possible.

The terms "a" and "an" herein do not denote a limitation of quantity, but rather denote the presence of at least one of the referenced items. The terms "having", "comprising", "including", and variations thereof signify the presence of a component.

The terms "photo(s)", "picture(s)", and "images(s)" used herein may be synonymous when used in the context of capturing an image by using a device with a light sensor to capture light and covert said light into a digital image. The term "video(s)" used herein may refer to a display of multiple digital images in rapid succession to show motion of an object in said multiple digital images.

In an aspect, embodiments of the present disclosure comprises a system for cooperative photography, the system comprising:

at least a first user device relating to a first user;

at least a second user device relating to a second user;

at least one server arrangement, wherein the server arrangement is communicably coupled to the first user device, the second user device;

wherein the server arrangement is configured to:

receive from the first user device, a first request to have the cooperative photography;

propagate the first request received from the first user device to have the cooperative photography to the at least one second user device;

receive from the second user device, at least one response corresponding to the first request to have the cooperative photography, wherein the response from the second user device comprises, at least an acceptance of the second user via the second user device to participate in the cooperative photography.

The present disclosure provides a system for cooperative photography that allows multiple users to collaborate in capturing and sharing photos and/or videos. The system includes at least a first user device and a second user device, both connected to each other using a server arrangement or Wi-Fi™, or Bluetooth™, or Near Field Connectivity NFC™. The first user can initiate a request for cooperative photography, which is then propagated to the at least oner second user device. The second user can then respond to the request, indicating their acceptance to participate in the cooperative photography or rejecting to participate. This system offers several advantages. Firstly, it enables real-time wireless transfer of photos from the second user device to the first user device, allowing for immediate viewing and collaboration. Additionally, the second user can also be a publicly installed camera, drone, or any device capable of capturing photos without human intervention, expanding the possibilities for cooperative photography. The synergy between the server arrangement, the user devices, and the acceptance response from the second user device creates a seamless and efficient process for cooperative photography, enhancing collaboration and enabling new creative opportunities.

Throughout the present disclosure, the term "first user" refers to an individual who initiates or engages with a particular system, application, or device firstly. The term "first user device" refers to a specific electronic device, such as a smartphone, tablet, or computer, that is utilized by the first user to interact with the aforementioned system, application, or device.

The system for cooperative photography, comprising at least one user device associated with a first user. The system for cooperative photography involves the use of at least one user device associated with the first user. Additionally, the system allows for the inclusion of a second user, which can be a user or a publicly installed camera, or a drone, or any device capable of capturing photos without human intervention. The purpose of including the second user in the system is to enable cooperative photography, where multiple users can contribute photos to a shared platform or event. This enhances the overall photography experience by allowing different perspectives and capturing moments from various angles. The system facilitates real-time wireless transfer of photos captured by the second user device to the first user device. This enables the first user to view the photos instantaneously, ensuring a seamless and efficient cooperative photography process. Furthermore, the system incorporates a charging mechanism where the first user is charged points or currency based on the number of photos received from the second user. This incentivizes active participation and encourages the second user to contribute high-quality photos, thereby enhancing the overall value and engagement of the cooperative photography system.

Throughout the present disclosure, the term "second user device" refers to a portable electronic device, such as a smartphone, tablet, or laptop, that is utilized by an individual other than the primary user for various purposes, including but not limited to communication, data processing, internet browsing, and multimedia consumption.

The system for cooperative photography, comprising the second user device associated with the second user. The system for cooperative photography includes the second user device that can be a user device or a publicly installed camera, a drone, or any device capable of capturing photos without human intervention. This device is connected wirelessly to the first user device using server arrangement, Wi-Fi™, Bluetooth™, NFC™ enabling real-time transfer of photos from the second user device to the first user device. The photos are transferred along with the actual photo content, ensuring that the first user can view the images as they are captured. The purpose of this system is to facilitate cooperative photography, allowing multiple users to contribute photos to a central platform or application. By including a variety of second user devices such as cameras or drones, the system enables a diverse range of perspectives and sources for capturing photos. This enhances the overall photography experience and encourages collaboration among users. The technical effect of this is that it enables a seamless and wireless transfer of photos from the second user device to the first user device in real time. This eliminates the need for manual intervention or physical transfer of photos, streamlining the cooperative photography process.

Throughout the present disclosure, the term "server arrangement" refers to a configuration of servers that are organized and interconnected to facilitate the storage, processing, and distribution of data and services. Particularly, the term "server arrangement" refers to an arrangement of one or more servers that includes one or more processors configured to perform various operations, for example, as mentioned earlier. Optionally, the server arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the server arrangement can be implemented by way of a single hardware server. The server arrangement can alternatively be implemented by way of a plurality of hardware servers operating in a parallel or distributed architecture. As an example, the server arrangement may include components such as a memory unit, a processor, a network adapter, and the like, to store and process information pertaining to the document and to communicate the processed information to other computing components, for example, such as a client device. Furthermore, the server arrangement comprises a database arrangement for storing data therein.

The term "communicably coupled" refers to the ability of two or more devices to establish a connection and exchange information or data through a communication medium.

The system for cooperative photography, comprising at least one server arrangement communicably coupled to the first user device and the second user device. The system for cooperative photography enables the transfer of photos from a second user device to a first user device in real time wirelessly. This transfer is done by establishing a communication link between the server arrangement and both the first and second user devices. The actual photo captured by the second user device is transmitted to the first user device, allowing them to view it instantly. This transfer of photos between users is done to facilitate cooperative photography, where multiple users can contribute their photos to a shared platform. By enabling real-time wireless transfer, users can quickly and conveniently share their photos with others, enhancing collaboration and interaction in photography. The technical effect of this system is the seamless and immediate sharing of photos between users. It eliminates the need for manual transfer methods, such as physically connecting devices or using external storage media. Additionally, the system allows for the integration of various devices, including publicly installed cameras, drones, or any device capable of capturing photos without human intervention.

Throughout the present disclosure, the term "propagate" refers to the act of transmitting or spreading information, signals, or data from one point to another. The term "first request" refers to the initial inquiry or solicitation made by a first user or device to obtain a particular service or information.

The system for cooperative photography, comprising the server arrangement configured to propagate the first request received from the first user device to the at least one second user device. The system for cooperative photography operates by utilizing a server arrangement that is configured to receive a first request from a first user device. This first request is then propagated to at least one second user device, enabling cooperative photography. The photos captured by the second user device are wirelessly transferred in real-time to the first user device, allowing immediate viewing of the actual photo. The purpose of this system is to facilitate collaborative photography, where multiple users can contribute to capturing photos and share them seamlessly. By enabling the first user to send a request to the second user device, it allows for a coordinated effort in capturing photos and enhances the overall photography experience. The system for cooperative photography, wherein the server arrangement is configured to receive a first request from the first user device to engage in cooperative photography. The system for cooperative photography operates by receiving a first request from the first user device through the server arrangement. This request initiates the process of engaging in cooperative photography. The purpose of receiving the first request is to enable the first user to participate in cooperative photography, where multiple users collaborate to capture photos collectively. The technical effect of this system is the seamless interactions between the first user and the second user who is willing to take photographs for the first user.

Throughout the present disclosure, the term "response" refers to the action or behavior exhibited by a system, device, or user in reaction to a stimulus or input.

The system for cooperative photography, wherein the server arrangement is configured to receive, from a second user device, at least one response corresponding to a first request for cooperative photography. The response from the second user device comprises an acceptance or a rejection, via the second user device of the second user's participation or no participation in the cooperative photography. The system enables cooperative photography by allowing the first user to send the request for cooperative photography to a server arrangement. The server arrangement is configured to receive at least one response from a second user device in response to the request. The response includes an acceptance of the second user's participation in the cooperative photography. The photos captured by the second user device are transferred wirelessly in real-time to the first user device, allowing the first user to view the photos connected to the actual photo being taken. Cooperative photography allows multiple users to collaborate and contribute to capturing photos. By enabling the second user to participate in the cooperative photography, the system enhances the overall photography experience by incorporating different perspectives and capturing moments that may not have been possible with a single user. This fosters creativity, diversity, and a sense of community among the users. The system facilitates seamless and instant transfer of photos from the second user device to the first user device, enabling real-time viewing. It also provides the ability to connect the photos to the actual photo being taken, enhancing the context and understanding of the captured images.

In accordance with an embodiment, the first request received from the first user device to have the cooperative photography is propagated to the at least one second user device based on at least one pre-defined geographic parameters between the first user device and the second user device, scanning a Quick Response QR code in the second user device using the first user device, by selecting at least one second user device from a virtual map. The term "pre-defined geographic parameters" refers to predetermined or established boundaries or limits that are set based on geographical factors such as location, distance, coordinates, or specific regions.

The system for cooperative photography operates by receiving a first request from a first user device, indicating the desire to engage in cooperative photography. This request is then propagated to at least one second user device, which can be a user or publicly installed camera, or drone, or any device capable of capturing photos without human intervention. The propagation of the request is based on pre-defined geographic parameters that establish a connection between the first user device and the second user device. The propagation of the request is also based on scanning a Quick Response QR code in the second user device using the first user device, by selecting at least one second user device from a virtual map. This ensures that the second user device is within a specified proximity to the first user device, enabling efficient collaboration in capturing photos. The purpose of propagating the first request to the second user device is to enable cooperative photography between multiple users. By involving additional devices, such as publicly installed cameras or drones, the system expands the possibilities for capturing diverse perspectives and enhancing the overall photography experience. The predefined geographic parameters ensure that the second user device is located in a suitable position to contribute valuable photos to the cooperative photography session.

In accordance with an embodiment, the first request received from the first user device to have the cooperative photography is propagated to the plurality of different user devices until the at least one response is received from the at least one user device of the plurality of different user devices. Throughout the present disclosure, the term "plurality of different user devices" refers to a collection of multiple distinct electronic devices utilized by users, which may include but are not limited to smartphones, tablets, laptops, desktop computers, wearable devices, and any other similar devices capable of performing various functions and tasks.

The system for cooperative photography operates by initially receiving a request from the first user device to engage in cooperative photography. This request is then transmitted to a plurality of different user devices. The transmission process continues until at least one response is received from at least one user device within the plurality of different user devices. The purpose of this system is to enable collaborative photography, allowing multiple users to contribute in the photography. By propagating the initial request to multiple user devices, the system increases the likelihood of receiving responses and thereby enhances the collaborative aspect of the photography process.

In accordance with an embodiment, the at least one response received from the second user device comprises acceptance or rejection of the second user corresponding to the first request to have the cooperative photography. Throughout the present disclosure, the term "rejection" refers to the act of refusing or declining a request, proposal, or application, typically due to the presence of certain flaws, deficiencies, or non-compliance with specified criteria.

The system for cooperative photography enables the second user, which can be a user or a publicly installed camera, or a drone, or a device capable of capturing photos without human intervention, to respond to the first user's request for cooperative photography. The second user device receives at least one response from the second user, indicating acceptance or rejection of the request. This response is transmitted wirelessly in real-time to the first user device, allowing the first user to know the choice of second user. This system facilitates collaboration between the first user and the second user, who may be a user or an automated camera, drone, or similar device. By allowing the second user to accept or reject the cooperative photography request, the system ensures that both parties are willing to engage in the collaborative activity. This helps to establish consent and avoid any potential privacy or legal issues.

In accordance with an embodiment, the system comprises at least one application module configured to provide a user interface to the first user device and the second user device using an application module. Throughout the present disclosure, the term "application module" refers to a software component or program that performs specific functions within an application, enabling the application to carry out various tasks and operations. The term "user interface" refers to the means by which a user interacts with a computer system or software application, typically through visual elements such as menus, buttons, and graphical displays, allowing the user to input commands and receive feedback.

The system for cooperative photography utilizes at least one application module that is configured to provide a user interface to both the first user device and the second user device. This allows seamless communication and interaction between the two devices during the cooperative photography process. The purpose of providing a user interface to both the first user device and the second user device is to enable effective collaboration and coordination between the users. By having a user interface, the first user can easily communicate their requirements and preferences to the second user. This also enables the first user to view the photos instantly and in connection with the actual photo-taking process. Additionally, the system can charge the first user based on the number or quality of photos received from the second user, providing a mechanism for fair compensation and incentivizing participation in the cooperative photography system.

In accordance with an embodiment, the application module is configured to provide the first user device and the second user device, via the user interface, a user feedback and/or user rating page which enables the first user and the second user to provide a feedback and/or a user rating to each other, based on experiences of the first user and the second user. Throughout the present disclosure, the term "user feedback" refers to the information, opinions, and suggestions provided by users of a product or service, which can be used to evaluate and improve its performance and user satisfaction. The term "user rating" refers to a numerical or qualitative assessment given by users to express their level of satisfaction or dissatisfaction with a product or service. The term "experiences" refers to the subjective encounters, interactions, and perceptions of users while engaging with a product or service, which can encompass various aspects such as usability, functionality, and overall user satisfaction.

The system for cooperative photography enables the first user and the second user to provide feedback and/or a user rating to each other based on their experiences. This is achieved by configuring the application module to provide a user feedback and/or user rating page via the user interface on both the first user device and the second user device. The user interface allows the first user and the second user to input their feedback and/or user rating, which is then stored and associated with their respective profiles. The purpose of providing a user feedback and/or user rating page is to facilitate communication and evaluation between the first user and the second user in the cooperative photography system. By allowing them to provide feedback and/or a user rating to each other, it promotes transparency, accountability, and improvement in the overall user experience. This feedback and rating mechanism encourages users to provide constructive criticism, acknowledge positive experiences, and helps in building trust and credibility within the cooperative photography community. The technical effect of implementing the user feedback and/or user rating page is that it enhances the functionality and usability of the cooperative photography system. It enables the first user and the second user to share their experiences and opinions, which can be valuable for future users in making informed decisions. Additionally, the feedback and rating data can be analyzed to identify patterns, trends, and areas for improvement in the system. This information can be used to enhance the user interface, optimize the performance of the application module, and refine the overall cooperative photography experience.

In accordance with an embodiment, the server arrangement is configured to prioritize the propagation of the first request received from the first user device to have the cooperative photography to the user device having higher user ratings compared to the other users of the plurality of users. The term "prioritize" refers to the act of assigning a higher level of importance or preference to a certain task, request, or action over others in order to allocate resources or attention accordingly. The term "propagation" refers to the process of transmitting or spreading information, signals, or data from one point to another, often involving the transfer of data packets or the dissemination of updates across a network or system.

The system for cooperative photography prioritizes the propagation of the first request received from the first user device to the user device with higher user ratings among the plurality of different user devices. This is achieved by transferring the photos captured by the second user device to the first user device in real-time wirelessly, while maintaining a connection to the actual photo. This prioritization is implemented to ensure that the user device with higher user ratings, which indicates a higher level of trust or expertise, is given preference in participating in cooperative photography. By doing so, the system aims to enhance the overall quality and reliability of the cooperative photography experience for the first user. The technical effect of this prioritization is that it allows the first user to collaborate with a user device that has a proven track record of producing high-quality photos or providing a reliable photography service. This improves the likelihood of obtaining satisfactory results and reduces the risk of engaging with user devices that may have lower user ratings or uncertain performance capabilities.

In accordance with an embodiment, the first user device and the second user device are communicably coupled using at least Wi-Fi™, Bluetooth™, Near Field Connectivity NFC™. Throughout the present disclosure, the term "Wi-Fi™" refers to a wireless communication technology that allows devices to connect to the internet or exchange data over a local area network using radio waves. The term "Bluetooth™" refers to a short-range wireless communication technology that enables devices to connect and exchange data over short distances. The term "Near Field Connectivity NFC™" refers to a wireless communication technology that allows devices to establish a connection by bringing them close together, typically within a few centimeters. The system enables cooperative photography by establishing a wireless communication link between the first user device and the second user device. This communication link can be established using Wi-Fi™, Bluetooth™, or Near Field Connectivity NFC™ technologies. This communication link allows for the real-time transfer of photos from the second user device to the first user device. By enabling wireless transfer, the photos can be viewed by the first user immediately, providing a seamless and convenient experience. The use of wireless communication technologies such as Wi-Fi™, Bluetooth™, or Near Field Connectivity NFC™ ensures efficient and reliable data transfer between the devices. This allows for the instant viewing of photos in real time, enhancing the cooperative photography experience. Additionally, the system can also facilitate the charging of the first user based on the number of photos received from the second user, providing a mechanism for fair compensation.

The real-time wireless transfer of photos between the first user device and the second user device may be automatic. For example, the second user may use the second user device to capture the first user picture of the first user.

When the first user device of the first user is communicably coupled to the second user device via the server arrangement, and when the first user picture is captured using the application module configured on the second user device, computer-readable instructions configured on the server arrangement may cause the server arrangement to transfer the first user picture from the second user device to the first user device without the second user explicitly providing any instruction to send the first user picture to the first user device. This allows easy facilitation of the collaborative photography.

Furthermore, once the first user picture is sent from the second user device to the first user device, the first user picture may not be available on the second user device. This allows for increased privacy since only the first user will be able to permanently view the first user picture. The first user picture may only be transiently stored in a memory of the second user device before the first user picture is transferred to the server arrangement and then to the first user device. Alternatively, the first user picture may never be stored on the second user device, and instead always be stored in the memory of the server arrangement before being transferred to the first user device.

DETAILED DESCRIPTION OF THE DRAWINGS

The present disclosure provides a system for cooperative photography in which at least two users (which are stranger to each other) participate in the cooperative photography without sharing the devices like mobile phones, cameras etc. and without the fear of any theft and burglary.

Referring to FIG. 1, illustrated is a system for cooperative photography in which a first user device 102 and a second user 104 device is communicably coupled with a server arrangement 106. The system 100 for cooperative photography comprises at least a first user device 102 relating to a first user, at least a second user device 104 relating to a second user, at least one server arrangement 106, wherein the server arrangement 106 is communicably coupled to the first user device 102, and the second user device 104, wherein the server arrangement 106 is configured to: receive from the first user device 102, a first request to have the cooperative photography; propagate the first request received from the first user device 102 to have the cooperative photography to the at least one second user device 104; receive from the second user device 104, at least one response corresponding to the first request to have the cooperative photography, wherein the response from the second user device 104) comprises, at least an acceptance of the second user via the second user device 104 to participate in the cooperative photography.

Figure 2:
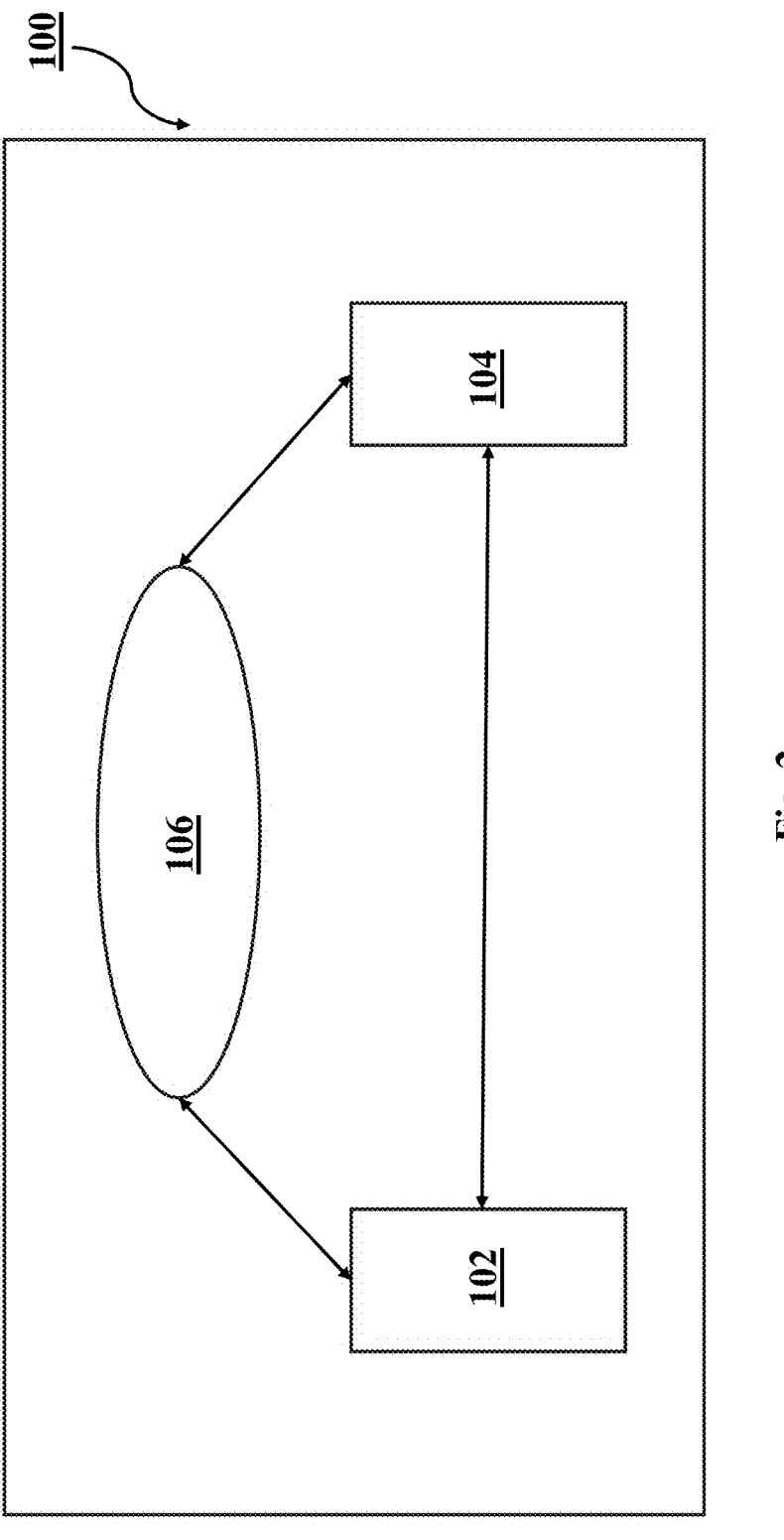
FIG. 2 illustrates the system for cooperative photography in which the first user device and the second user device are communicably coupled with each other and with the server arrangement.

Referring to FIG. 2, illustrated is the system for cooperative photography in which the first user device 102 and the second user device 104 is communicably coupled with each other and to the server arrangement 106. The first user device 102 relating to the first user, at least a second user device 104 relating to the second user are communicably coupled to each other using at least Wi-Fi™, Bluetooth™, Near Field Connectivity NFC™.

We claim:

1. A system (100) for cooperative photography, the system comprising:
   at least a first user device (102) relating to a first user;
   at least a second user device (104) relating to a second user;
   at least one application module;
      at least one server arrangement (106), wherein the server arrangement (106) is communicably coupled to the first user device (102), and the second user device (104);
   wherein the server arrangement (106) is configured to:
      receive from the first user device (102), a first request to have the cooperative photography;
      propagate the first request received from the first user device (102) to have the cooperative photography to the at least one second user device (104);
      receive from the second user device (104), at least one response corresponding to the first request to have the cooperative photography, wherein the response from the second user device (104) comprises, at least an acceptance of the second user via the second user device (104) to participate in the cooperative photography,
   wherein the application module is configured to provide the first user device (102) and the second user device (104), via a user interface, a user feedback and user rating page which enables the first user and the second user to provide a feedback and a user rating to each other, based on experiences of the first user and the second user.

2. The system (100) for cooperative photography according to claim 1, wherein the first request received from the first user device (102) to have the cooperative photography is propagated to the at least one second user device (104) based on at least one pre-defined geographic parameters between the first user device (102) and the second user device (104).

3. The system (100) for cooperative photography according to claim 1, wherein the first request received from the first user device (102) to have the cooperative photography is simultaneously propagated to a plurality of different user devices, and wherein the first request received from the first user device (102) to have the cooperative photography is propagated to the plurality of different user devices until the at least one response is received from the at least one user device of the plurality of different user devices.

4. The system (100) for cooperative photography according to claim 1, wherein the at least one response received from the second user device (104) comprises acceptance or rejection of the second user corresponding to the first request to have the cooperative photography.

5. The system (100) for cooperative photography according to claim 1, wherein the at least one application module is configured to provide the user interface to the first user device (102) and the second user device (104), wherein the application module enables the first user to make the first request to have the cooperative photography, and the second user to provide the response corresponding to the first request to have the cooperative photography.

6. The system (100) for cooperative photography according to claim 1, wherein the server arrangement is configured to prioritize the propagation of the first request received from the first user device (102) to have the cooperative photography to the user device having higher user ratings compared to the other user devices of the plurality of different user devices.

7. The system (100) for cooperative photography according to claim 1, wherein the first user device (102) and the second user device (104) are communicably coupled using at least Wi-Fi™, Bluetooth™, Near Field Connectivity NFC™.

8. The system of claim 1, wherein the first user picture is not accessible on the second user device after the first user picture is automatically sent from the second user device to the server arrangement.

9. A method for cooperative photography comprising:
   at least a first user device (102);
   at least a second user device (104);
   at least one application module;
   communicably coupling at least one server arrangement (106) to the first user device (102) and the second user device (104);
   receiving a first request from the first user device (102) to the server arrangement (106) to have cooperative photography;
   propagating the first request to the second user device (104) to have the cooperative photography to the at least one second user device (104);
   receiving from the second user device (104), at least one response corresponding to the first request to have the cooperative photography, wherein the response from the second user device (104) comprises, at least an acceptance of the second user via the second user device (104) to participate in the cooperative photography,
   wherein the application module is configured to provide the first user device (102) and the second user device (104), via a user interface, a user feedback and user rating page which enables the first user and the second user to provide a feedback and a user rating to each other, based on experiences of the first user and the second user.

\* \* \* \* \*